United States Patent [19]

Anderson et al.

[11] Patent Number: 4,726,286

[45] Date of Patent: Feb. 23, 1988

[54] STORAGE STRUCTURE AERATION SYSTEM

[75] Inventors: Donald E. Anderson, Maumee; Glenn E. Hall, Toledo, both of Ohio

[73] Assignee: The Andersons, Maumee, Ohio

[21] Appl. No.: 916,286

[22] Filed: Oct. 7, 1986

Related U.S. Application Data

[63] Continuation-in-part of Ser. No. 675,207, Nov. 27, 1984, Pat. No. 4,627,333.

[51] Int. Cl.[4] .............................................. A01F 25/08
[52] U.S. Cl. ............................................ 98/56; 98/52
[58] Field of Search ................................ 98/52, 55, 56; 99/646 S; 135/99; 160/53, 368 G; 414/287, 292, 299, 325, 326, 418, 919

[56] References Cited

U.S. PATENT DOCUMENTS

| 179,976 | 7/1876 | Tuck et al. | |
|---|---|---|---|
| 842,538 | 1/1907 | Elward | 98/56 |
| 1,473,845 | 11/1923 | Gardon | |
| 1,909,066 | 5/1933 | Nemec | |
| 2,730,150 | 1/1956 | Wunderwald et al. | |
| 2,811,164 | 10/1957 | Ames | 135/99 X |
| 2,856,838 | 10/1958 | Mack | 98/55 |
| 2,895,400 | 7/1959 | Topf | 98/55 |
| 3,196,774 | 7/1965 | Kripal | 98/55 |
| 3,539,057 | 11/1970 | Bronner | |
| 3,727,656 | 4/1973 | Luders | 150/1 |
| 4,121,389 | 10/1978 | Ptaszek | 52/2 |
| 4,162,017 | 7/1979 | Noyon | 414/287 X |
| 4,224,770 | 9/1980 | Petty | 52/82 |
| 4,413,029 | 11/1983 | Handwerker | 428/61 |
| 4,454,807 | 6/1984 | Wolstenholme | 99/646 S |
| 4,493,248 | 1/1985 | Wolstenholme | 98/52 |
| 4,502,369 | 3/1985 | Aldag | 98/56 |
| 4,520,714 | 6/1985 | Gullickson | 98/56 |

FOREIGN PATENT DOCUMENTS

| 1418308 | 10/1965 | France | 135/99 |
|---|---|---|---|
| PCT/811000-21 | of 0000 | PCT Int'l Appl. | |
| 2027180 | 2/1980 | United Kingdom | 34/91 |
| 884620 | 11/1981 | U.S.S.R. | 98/56 |
| 993874 | 2/1983 | U.S.S.R. | 99/646 S |

*Primary Examiner*—Harold Joyce
*Attorney, Agent, or Firm*—Emch, Schaffer, Schaub & Porcello Co.

[57] ABSTRACT

An improved aeration system for use with a storage structure for storing particulate material such as grain. The storage structure includes a large flexible cover which is vertically movable relative to a center vertical support. The aeration system includes a vessel adjacent the lower end of the support. Air inlet pipes extend radially outwardly from the vessel. One or more fans are in communication with the air inlet pipes to hold the cover down and to aerate the material. The cover hold down and the aeration begin during initial filling of the storage structure and continues after filling is completed. In another embodiment a second plurality of air inlet pipes extend inwardly from the cover periphery toward the support. Fans are in communication with the second plurality of air inlet pipes to aid in providing the hold down forces and in the aeration of the particulate material.

8 Claims, 7 Drawing Figures

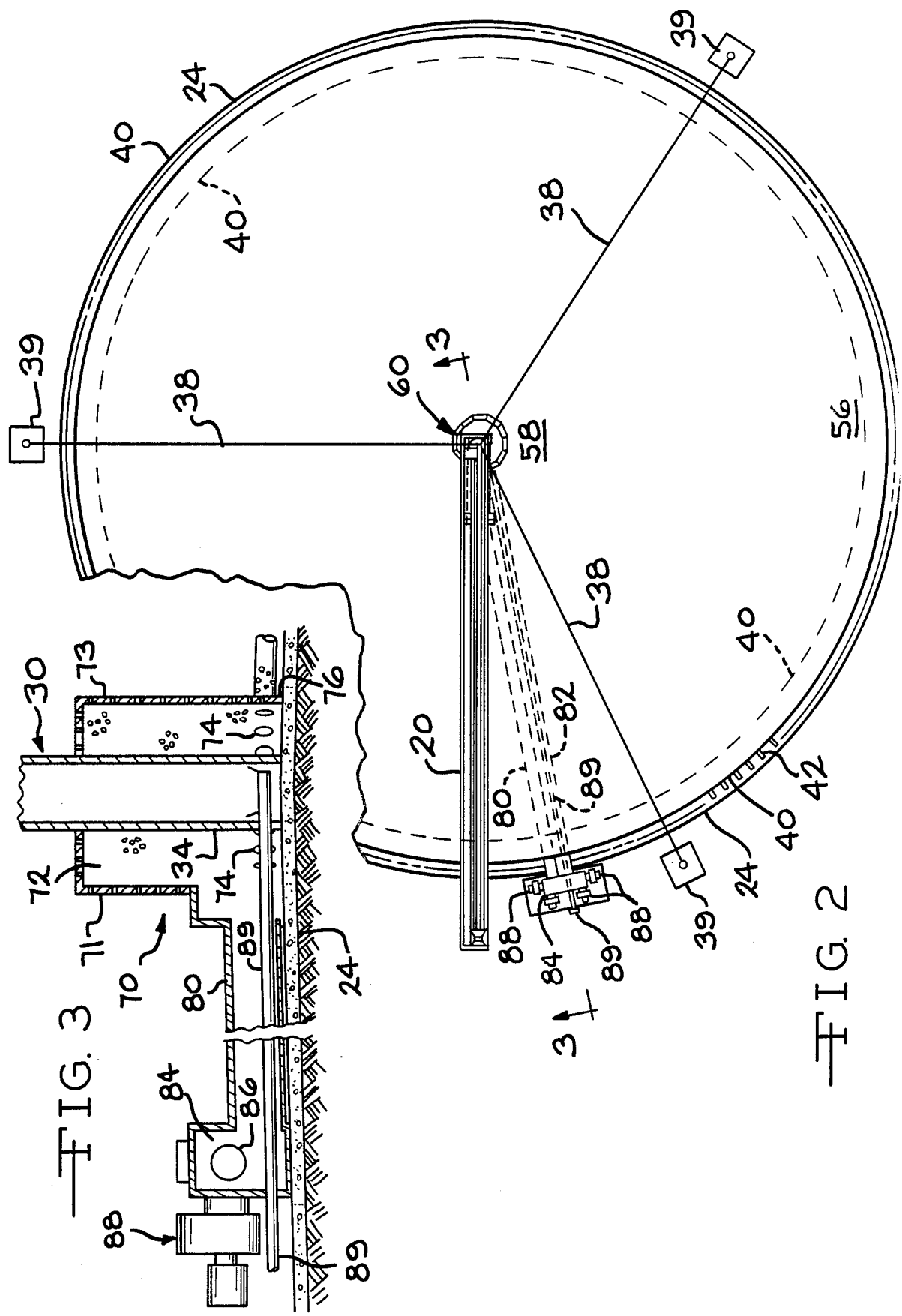

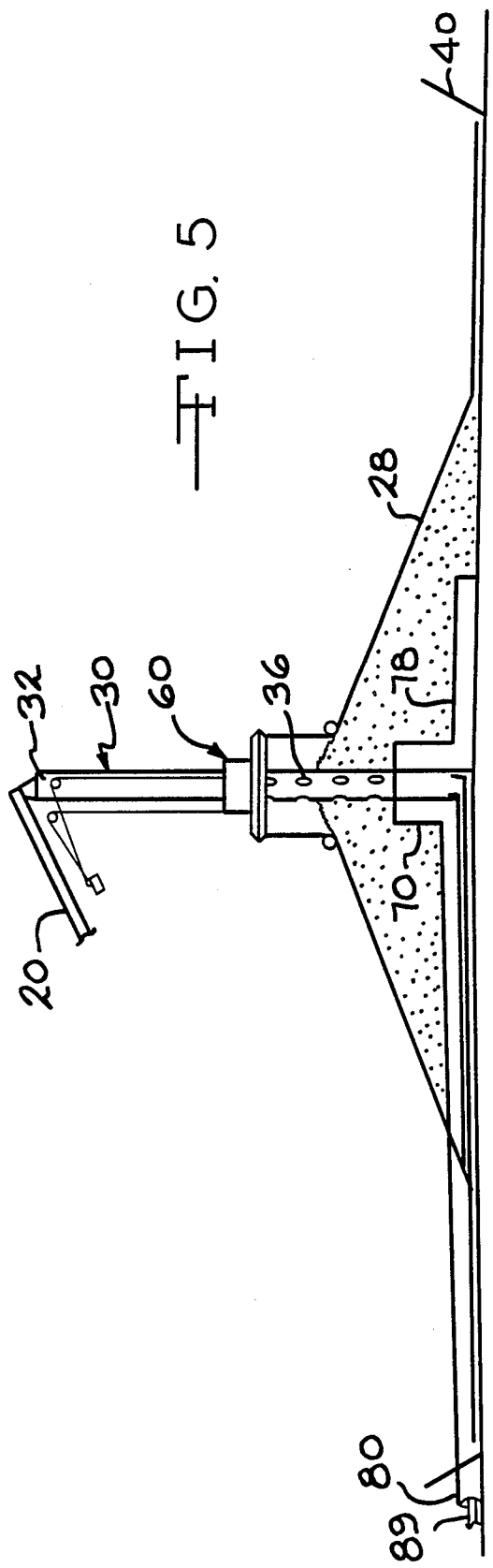
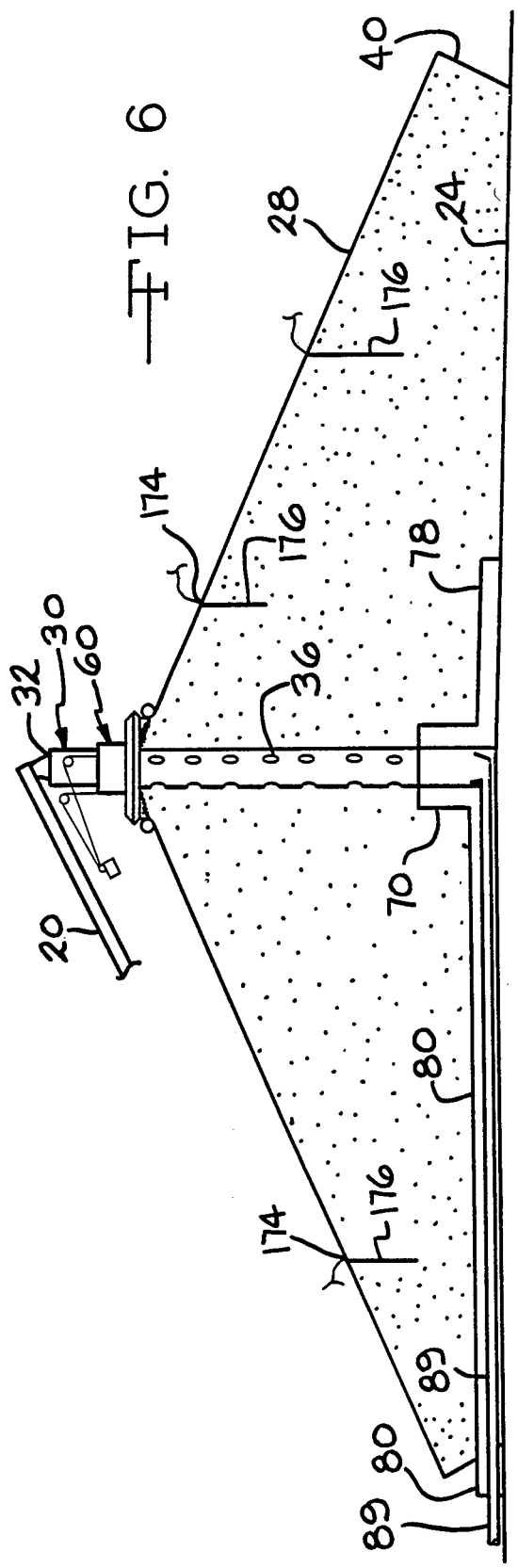

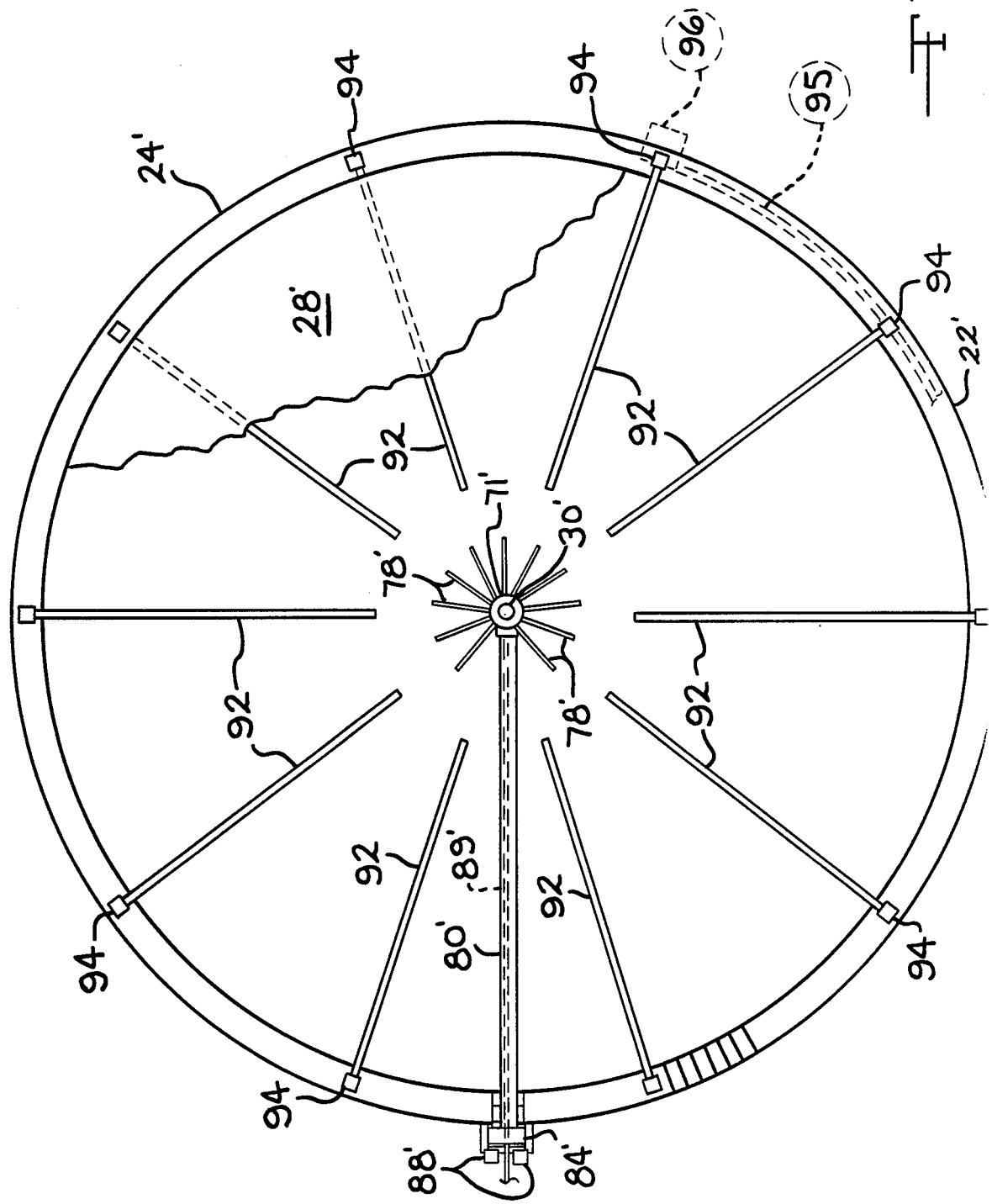

STORAGE STRUCTURE AERATION SYSTEM

RELATIONSHIP TO EXISTING APPLICATION

This application is a continuation-in-part application of Application Ser. No. 675,207, filed Nov. 27, 1984, now U.S. Pat. No. 4,627,333.

BACKGROUND OF THE INVENTION

The present invention relates to an improved aeration system for storage structures intended to provide low cost storage for particulate materials such as grains.

Current state-of-the-art low cost storage structures generally include a fabric cover positioned over a pile of particulate grain material to protect the material from the effects of the weather during the storage period. These storage structures have the ability to store large amounts of grain. Storage structures holding five hundred thousand or one million bushels of grain capacities are relatively common. Grain storage facilities holding over two million bushels of grain have also been constructed. The storage structures have a flexible fabric cover suspended over the stored grain. The grain is initially deposited under the cover. In storing the grain, two problems occur. One problem is to ensure the stability of the large size flexible covers, including during the start-up period, from high wind loadings. Because a million bushel storage unit has a cover diameter of approximately 250 feet, the wind loading can become substantial and damage or destroy the cover.

The second major problem relates to the aeration of the grain pile. A lack of proper aeration results in spoilage or damage to the grain.

The present invention is directed to an aeration system which reduces the possiblity of wind damage to the cover of a grain storage assembly, and which also provides aeration, both during initial filling and after total filling of the grain storage structure.

SUMMARY OF THE INVENTION

The invention relates to an improved aeration system for a storage structure. While the storage structures can hold all types of particulate materials, the improved aeration system is particularly useful in a low cost storage structure for the storage of grain. The storage structure includes a vertically extending center support and a large flexible cover mounted for movement adjacent the vertical center support. The improved aeration system, according to the present invention, includes a vessel positioned adjacent the lower end of the vertical support. A plurality of air inlet pipes are in communication with the vessel and extend radially outwardly from the vessel. Fan means are in communication with the vessel and the air inlet pipes to provide hold down forces on the cover and the aerate the particulate material stored under the cover. Because these air inlet pipes are relatively short and extend outwardly from the center of the storage structure, the aeration system is immediately effective upon the initial storing of the particulate material. This is important for two reasons. The danger of wind damage to the cover must be counteracted during the intial storing. Therefore, the application of hold down forces on the cover during the initial storing of particulate material is important. Secondly, when grain is being stored, because of the size of the storage structures, it could take several weeks or even months to fill the storage structure. Therefore, the present aeration system immediately begins to provide aeration and control the temperature of the grain to retard spoilage.

In another embodiment, a second plurality of air inlet pipes are provided. These inlet pipes extend radially from a point adjacent the outer periphery of the cover inwardly toward the center support. Fans are in communication with the respective air inlet pipes.

BRIEF DESCRIPTION OF THE DRAWINGS

FIG. 2 is a top view of the storage structure aeration system of the present invention, partially in phantom;

FIG. 3 is a sectional view taken along line 3—3 of FIG. 2;

FIG. 5 is a diagramatic view of an initial fill phase of the storage structure aeration system according to the present invention showing the initial storage of grain;

FIG. 6 is a view similar to FIG. 5 showing the storage assembly filled with grain; and FIG. 7 is a top view with the cover broken away showing another embodiment of a storage structure aeration system, according to the present invention.

DESCRIPTION OF THE PREFERRED EMBODIMENTS

Figure 4:
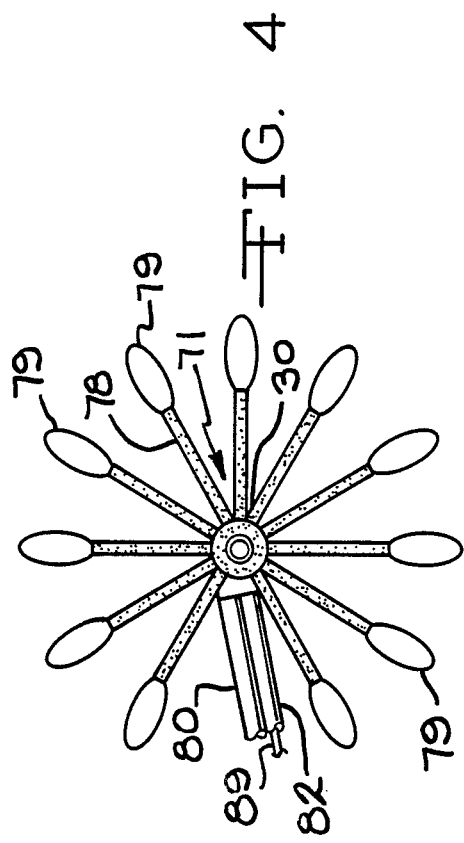
FIG. 4 is a top view of aeration system components taken along line 4—4 of FIG. 1.

The stoarge assembly 22 generally includes a retaining wall 40, a cover 28, a chute 30, a cap 60, and air circulation means 70. Grain is delivered from a conveyor 20 to the top of the storage assembly 22. Grain falls from the conveyor 20 and is deposited into the storage assembly 22. The chute 30 is positioned at the center of the storage assembly 22. The chute 30 has a substantially cylindrical shape. The chute 30 has a first open end 32 and a second end 34. The second end 34 of the chute 30 is firmly anchored to a bottom surface 24 of the storage assembly 22. As shown in FIG. 3, the bottom surface 24 may comprise an asphaltic pad. The chute 30 is anchored in a vertical position by wire rope guy lines 38. Each guy line 38 is anchored in a concrete deadman 39. In a preferred embodiment, the chute guy lines 38 are spaced at approximately 120° from each other. The chute 30 includes a plurality of openings 36 spaced along the chute 30. In one embodiment, the chute 30 has a diameter of approximately 42 inches, and the openings 36 have a diameter of approximately 12 inches. In addition, the openings 36 generally are spaced at 4 foot vertical intervals along the length of the chute 30 and the openings 36 are positioned at approximately 120° from each other. The grain enters the chute 30 through the open end 32 and falls in a downward direction towards the bottom surface 24 of the storage assembly 22. The grain falls into the second end 34 of the chute 30 and starts to fill the chute 30. As the grain continues to fall, the grain spills out of the chute 30 through the openings 36 onto the bottom surface 24 of the storage assembly 22. During the initial phase of filling the storage assembly 22, the grain is deposited on the bottom surface 24 in an area immediately adjacent the exterior circumference of a vessel 71 of the air circulation means 70. As additional grain is deposited in the storage assembly 22 the circumference of the growing grain pile continues to radially extend in a direction towards the retaining wall 40. Thus, the outer periphery or circumference of the grain pile increases.

Figure 1:
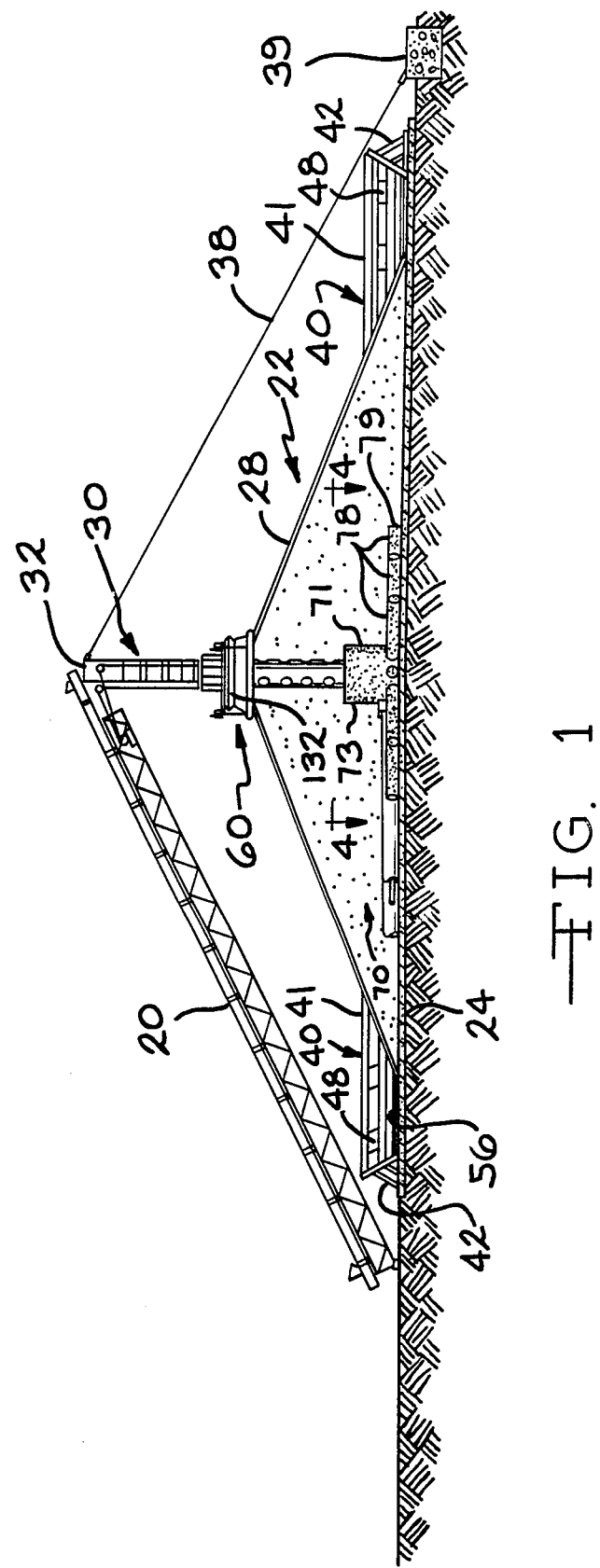
FIG. 1 is an elevational view, partially cutaway, of a storage structure including an aeration system according to the present invention.

The bottom surface or pad 24 radially slopes away from the chute 30 at a slight angle. The radial sloping of the bottom surface 24 prevents rain water or other standing water from accumulating on the bottom surface 24. In the present embodiment, the bottom surface or pad 24 is made of an asphalt and stone base and generally has a circular shape. The retaining wall 40 is positioned at an obtuse angle to the bottom surface 24. Referring now to FIGS. 1, 4 and 5, the retaining wall 40 includes a plurality of wall sections 41 positioned at an angle to each other such that the sections 41 form the substantially circular retaining wall 40. Each of the retaining wall sections 41 is supported by a plurality of braces or supports 42. The supports 42 are anchored to the bottom surface 24. Each of the retaining wall sections 41 further includes openings 48. Doors or valves are positioned in opposing relationship to the openings 48. In this embodiment, the individual doors on each retaining wall section 41 can be opened to allow air to flow through. The doors are manually or automatically operated. The doors are opened and closed in response to sensed grain and ambient air temperatures, wind velocities, and static pressures under the cover. The parameters could be analyzed by a microprocessor. In another embodiment, a sector of openings through the retaining wall are surrounded by a plenum chamber. The individual plenum chambers are then controlled manually or automatically to aerate the grain in the respective sectors and to hold down the cover.

The flexible cover 28 is made of a generally waterproof material such as a canvas or a polyvinyl chloride plastic material and has a substantially frustoconical shape. The cover 28 has an outer periphery 56 and a center portion 58. The cover 28 is normally anchored at the base of the retaining wall 40 during the initial fill-phase of the storage assembly 22. After the grain has reached the base of the retaining wall 40, the outer periphery 56 is detached from the retaining wall. After the grain has reached the top of the retaining wall 40, the outer periphery 56 is positioned over the upper end of the retaining wall 40. The cap 60 is positioned around the chute 30.

Referring now to FIGS. 3 and 4, the chute 30 is physically connected at its second or lower end 34 to the air circulation means 70. The air circulation means 70 includes the vessel 71 which axially surrounds the second end 34 of the chute 30. The vessel 71 defines a longitudinally extending annular space 72 between the outer surface of the chute 30 and the inside surface of the vessel 71. The vessel 71 includes a plurality of small apertures or perforations 73 extending through the walls of the vessel 71 and closely spaced on the walls of vessel 71. The vessel 71 further includes a plurality of openings 74 spaced at intervals around the base 76 of the vessel 71. Inlet pipes 78 are operatively attached to each of the openings 74 in a base 76 of the vessel 71. The inlet pipe 78 of the preferred embodiment is made of a hollow, perforated, substantially rigid material. Each inlet pipe 78 extends radially from the vessel 71, as best seen in FIG. 4. The inlet pipes 78 are perforated to allow air to flow through the perforations into the inlet pipe 78. A cable 79 is operatively connected to the distal end of each of the inlet pipes 78 in a looping or circular fashion such that each inlet pipe 78 may be disconnected from the vessel 71 by grasping the cable 79 and pulling the cable 79 in a radial direction away from the vessel 71 to detach the inlet pipe 78. The inlet pipes 78 may be detached from the vessel 71 when grain is being removed from the storage assembly 22. The air circulation means 70 further includes one or more non-perforated air ducts 80 and 82 and fan means 88. The air ducts 80 and 82 extend from the vessel 71 in a radial direction. The air ducts 80 and 82 penetrate the wall of the vessel 71. The air ducts 80 and 82 terminate in a plenum 84. The plenum 84 includes a plurality of openings 86. Fan means 88 are operatively positioned immediately adjacent each opening 86.

The fan means 88 acts to circulate air from the exterior environment through the grain pile as follows: air flows through the grain pile through the openings 48 on the retaining wall 40 and through openings 132 on the cap 60. Air flows through the stored grain pile and into the annular space 72 through the perforations in the vessel 71 and through the perforations in each inlet pipe 78. Air flows through the inlet pipes 78, through the openings 74 in the vessel 71, and into the annular space 72. The air flows from the annular space 72 through the air ducts 80 and 82 to the fan plenum 84 and exits to the exterior environment through the fan means 88.

The four fan means 88 are each equipped with an exhaust door which can be either fully opened or fully closed. In addition, one of the fan means 88 is equipped with a choke slide which can be held in any predetermined position such that air flow through the fan means 88 can be choked off completely or not at all or anywhere in between.

An auger 89, which is axially positioned in one of the air ducts 82, and which can draw material only from the second end 34 of the chute 30 is used to remove fine material from the center of the pile.

The storage assembly 22 is operated as follows: the grain is delivered from the conveyor 20 into the upper open end 32 of the chute 30. Grain falls out from the chute 30 through the spaced vertical openings 36 and onto the bottom surface 24 of the storage assembly 22. The cover 28 is positioned on the storage assembly 22 prior to the introduction of grain into the storage assembly 22. The cover 28 is deployed in a first, lowered position. The cap 60 extends downwardly along the chute 30 to a lowered postion. In like manner, it is desirable that the cover 28 remain in a lowered position adjacent the stored grain material in order to have as little air as possible trapped underneath the cover 28. In the present embodiment, the cap 60 and its vertically adjustable torus act to place tension on the cover 28 such that any wrinkles or excess material of the cover 28 are oriented in a radial manner and not in a circumferential manner. Because the radial distance along the cover is the same as the hypotenuse of a triangle defined by the cover, the vertical axis of the chute and the radius of the bottom surface, the function of the cap and its vertically adjustable torus is to tension the cover material until the distance from the top of the cover to the torus plus the distance from the torus to the outer edge of the cover equals such hypotenuse. This minimized the effect of wind forces during loading and also minimizes the formation of circumferential or other non-radial folds in the cover which tend to cause grain to become entangled with the cover as the grain slides under the cover.

During the initial fill phase of the storage assembly 22, the torus of the cap 60 is in its lowermost position along the chute 30 to keep tension on the cover 28. The cover 28 is operatively attached to the retaining wall 40 adjacent the base of the retaining wall 40. As the grain continues to fill the storage assembly 22 the grain is deposited along the bottom surface 24. When the grain reached the retaining wall 40, the cover 28 is untied or detached from the base of the retaining wall 40. Additional grain is supplied to the storage assembly 22 and deposited along the full height of the retaining wall 40. The outer periphery 56 of the cover 28 is then placed over the upper end of the retaining wall 40 and tied down. As the cover 28 is raised and the grain approaches the retaining wall 40 the torus is elevated toward the cap 60.

During the storage of the grain in the storage assembly 22, it is desirable to maintain temperatures within predetermined upper and lower limits within the stored grain pile. In a preferred embodiment, the cover 28 contains a plurality of small apertures 174. The temperature of the grain pile is monitored at various times by thermocouples 176 which have been introduced through the apertures 174 into the stored grain pile. The leadwires from the thermocouples 176 extend upward through the apertures 174 to the outside of the storage assembly 22, where the temperatures sensed by the thermocouples can be read with a suitable instrument.

The control of the temperature within the stored pile of grain is achieved by controlling the flow of air through the stored pile of grain. One or more of the valves or doors in the retaining wall sections 41 can be opened such that air flows through the opening or openings 48 adjacent the open door or doors. The air is circulated through the stored grain pile by the operation of the fan means 88. In addition, one or more of the doors on the cap 60 can be opened such that air flows through the opening or openings 132.

When the temperature of the stored grain is acceptable and little or no wind is blowing, it is not necessary to run any of the fan means 88. When the temperature of the stored grain is acceptable, but a strong enough wind is blowing, it is desirable to have static pressure under the cover 28 without air flow. When air flow is required, it may be required with little or much concomitant static pressure under the cover 28 depending on how hard the wind is blowing. Running zero, one, two, three, or four of the four fan means 88, plus positioning the four exhaust doors on the four fan means 88, the choke slide, which is on one of the fan means, in concert with the openings 48 in the retaining wall 40 and openings 132 in the cap 60, allow the maximum in combinations of static pressure only without air flow, maximum air flow, where desired, with concomitant static pressure, or any level of air flow lwss than maximum, also where desired, with a concomitant desired level of static pressure.

As grain is deposited in the grain storage assembly 22, fine material is concentrated near the chute 30 and concentrically around it. The fine material together with the whole grain is embedded within can be removed by an auger 89, which is axially positioned in one of the air ducts 82. When this is done, the cap 60 is lowered slightly, so that the cover 28 over the depression caused by the removal of the fine and whole grain describes a catenary along any radial line. Further, the openings 132 in the cap 60 are closed, and a predetermined negative pressure is applied by the fan means 88 which is equipped with a choke slide. The depression is then refilled with grain. Since the amount of fine material near the chute 30 is proportional to the distance the grain flows from the chute 30, the amount of fine material near the chute 30 is much less in the grain after the depression has been refilled. The net result is improved air flow in the center of the pile.

If the storage assembly 22 is only filled to any amount up to the point where the grain reaches the base of the retaining wall 40, or in any event, during the filling of the storage assembly 22 up to the base of the retaining wall 40, the only controlled way of admitting air is through the openings 132 in the cap 60.

In order to control dust emissions, negative pressure can be applied to the storage assembly 22 throughout its filling.

The center of a pile of grain which has been filled from the center is the most difficult part of the pile to get air through. The combination of the cap 60 and air inlet openings 132, the vessel 71 and air inlet pipes 78, and the provision for the removal of fine material, all symmetrical about the center, is an improved combination for assuring air flow in the center of the pile.

The embodiment of the invention described above is particularly adaptable to storage structures having capacities of roughly five hundred thousand bushels of particulate material. Referring to FIG. 7, another embodiment of the present invention is disclosed which is adaptable to larger storage structures, such as storage structures having capacities of one million bushels or higher.

The storage structure 22' includes a cover 28' mounted vertically on a central support, for example, a vertical chute 30'. The storage assembly 22' is mounted on a bottom surface or pad 24'. Again, the pad 24' may be constructed of various materials including asphaltic concrete or a Portland concrete. A vessel 71' surrounds the chute 30'. A first plurality of air inlet pipes 78' extend radially outwardly from the vessel 71'. These inlet pipes 78' are perforated. Air is drawn through the inlet pipe 78' to hold down the cover 28' and also to aerate the grain or other particulate materials stored in the storage structure 22'. In this embodiment, a single nonperforated air duct 80' extends between the vessel 71' and fans 88'.

A hearting screw or auger 89' is positioned within the air duct 80' and is used to draw fine materials from the center of the grain pile outwardly where they can be removed. This hearting procedure is necessary to provide proper aeration of the center of the grain pile.

In this embodiment, a second plurality of air inlet pipes 92 extend radially inwardly from points adjacent the outer periphery of the cover 28' toward the chute 30' and the toward the first plurality of inlet pipes 78'. The air inlet pipes 92 are also perforated and are in communication with individual fans 94 mounted at the outer ends of the pipes 92 adjacent the outer periphery of the cover 28'. In another embodiment of the invention, a manifold pipe 95 is connected to several ones of the inlet pipes 92 and is supplied by a single fan 96.

In both the embodiments shown in FIGS. 1-6 and in FIG. 7, the aeration system according to the present invention provides suction from the starting of filling with grain both to aerate the grain and to hold the cover down, even during the removal of fine material. The aeration systems disclosed also provide for either slow or rapid filling as opposed to the prior art systems which do not provide for the slow filling of grain as well as the aeration systems disclosed herein. The reason is that the inner aeration system including the air inlet pipes 78 immediately draw an optimally controlled amount of suction to not only hold the cover down, even during the removal of fine material, but also to aerate the grain and retard spoiling.

The inner air circulation system, which is includes in both embodiments, gives a more positive control of the cover 28 or 28' during multiple step hearting. There is a better ability to hold a precise, predetermined amount of static pressure during each sequential hearting. The air ducts 80 and 80' provide a channel for the hearting screw or auger 89, 89', which is used for the removal of the fine material which concentrates around the chute or the center support 30 during the filling of the grain pile. In addition, the vessel 71, 71' provides an access to the inner end of the hearting screw or auger 89, 89'. It is possible for a man to enter the air duct 80, 80' and use it as a passageway to reach the vessel 71, 71'. For example, in the embodiment shown in FIG. 7, the air duct 80' is constructed of 48 inch diameter corrugated pipe.

It has also been found that the present aeration system gives an improved and controlled flow of air down the center of the pile. The center of the pile is where there is the greatest potential for grain spoilage, even with a provision for removal of the fine material by hearting.

The above-detailed description of the present invention is given for explanatory purpose. It is to be understood that the storage structure of this invention can be used to store a wide variety of products. It will be apparent to those skilled in the art that numerous other changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

We claim:

1. An improved aeration system for a storage structure for grain, the storage structure including a vertically extending support and a flexible cover, having an outer periphery, mounted for movement adjacent the vertical support, said aeration system comprising, in combination, at least one first air opening adjacent to said outer periphery of said flexible cover, at least one second air opening adjacent to said vertically extending support, a vessel adjacent the lower end of the support, a plurality of air inlet pipes in communication with said vessel and extending radially outwardly from said vessel, fan means in communication with said vessel and said air inlet pipes for drawing a flow of air through said first and second air openings into said inlet pipes and said vessel, and auger means for removing fine materials present in the grain whereby said fan means when activated causes a flow of air through said first and second openings, said air inlet pipes and said vessel thereby creating a suction under the flexible cover which acts to hole the flexible cover against the grain and also acts to aerate the grain to retard spoilage throughout the placing of grain under the flexible cover.

2. An improved aeration system, according to claim 1, wherein said vessel surrounds said vertical support, said fan means including a fan mounted exterior of said outer periphery of said flexible cover and at least one non-perforated air duct in communication with said fan and said vessel.

3. An improved aeration system, according to claim 2, wherein said vessel is cylindrical and defines perforations in its surface.

4. An improved aeration system, according to claim 2, wherein at least two air ducts are in communication with said fan and said vessel, said auger means being operatively positioned in one of said air ducts.

5. An improved aeration system for a storage structure for grain, the storage structure including a vertically extending support and a flexible cover, having an outer periphery, mounted for movement adjacent the vertical support, said aeration system comprising, in combination, at least one first air opening adjacent to said outer periphery of said flexible cover, at least one second air opening adjacent to said vertically extending support, a vessel surrounding the lower end of said vertical support, a first plurality of air inlet pipes in communication with said vessel and extending radially outwardly from said vessel, fan means in communication with said vessel and said first plurality of air inlet pipes for drawing a flow of air through said first and second air openings into said first plurality of inlet pipes and said vessel, a second plurality of air inlet pipes radially spaced and extending from adjacent the outer periphery of the flexible cover inwardly toward said first plurality of air inlet pipes, second fan means in communication with said second plurality of air inlet pipes for drawing an additional flow of air through said first and second air openings and said second plurality of air inlet pipes whereby said first and second fan means when activated cause a flow of air through said first and second openings, said first and second plurality of air inlet pipes and said vessel thereby creating a suction under the flexible cover which acts to hold the flexible cover against the grain and also acts to aerate the grain to retard spoilage throughout the placing of grain under the flexible cover.

6. An improved aeration system, according to claim 5, including auger means for removing fine materials from the grain.

7. An improved aeration system, according to claim 6, wherein said first fan means comprises a fan mounted exterior of the cover periphery and at least one air duct in communication with said fan and said vessel.

8. An improved aeration system, according to claim 6, wherein said second fan means comprise individual fans in communication with respective ones of said second plurality of air inlet pipes.

* * * * *

UNITED STATES PATENT AND TRADEMARK OFFICE
CERTIFICATE OF CORRECTION

PATENT NO. : 4,726,286

DATED : Feb. 23, 1988

INVENTOR(S) : Anderson et al.

It is certified that error appears in the above—identified patent and that said Letters Patent is hereby corrected as shown below:

On the Title Page the inventors should read:

Inventors: Donald E. Anderson, Maumee, Ohio; Glenn E. Hall, Toledo, Ohio; Leonard A. Mahlman, Sylvania, Ohio Signed and Sealed this Sixteenth Day of August, 1988

*Attest:*

DONALD J. QUIGG

*Attesting Officer*     Commissioner of Patents and Trademarks